US012392182B2

(12) United States Patent
Young et al.

(10) Patent No.: US 12,392,182 B2
(45) Date of Patent: Aug. 19, 2025

(54) RELEASABLE HINGE ASSEMBLY

(71) Applicant: Teijin Automotive Technologies, Inc., Auburn Hills, MI (US)

(72) Inventors: Jeannette Young, Auburn Hills, MI (US); Timothy Young, Auburn Hills, MI (US); Daniel Edmunds, Auburn Hills, MI (US)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 4 days.

(21) Appl. No.: 18/418,411

(22) Filed: Jan. 22, 2024

(65) Prior Publication Data

US 2024/0159090 A1 May 16, 2024

Related U.S. Application Data

(62) Division of application No. 17/741,640, filed on May 11, 2022, now Pat. No. 11,905,750.

(60) Provisional application No. 63/213,822, filed on Jun. 23, 2021.

(51) Int. Cl.
*E05D 7/10* (2006.01)

(52) U.S. Cl.
CPC .......... *E05D 7/1066* (2013.01); *E05D 7/1011* (2013.01); *E05D 2007/1027* (2013.01); *E05Y 2900/55* (2013.01)

(58) Field of Classification Search
CPC ... E05D 7/1005; E05D 7/1011; E05D 7/1016; E05D 7/1061; E05D 7/1066; E05D 7/1083; E05D 2007/1027
USPC ......... 16/229, 230, 231, 257, 258, 259, 260, 16/261, 263, 267
See application file for complete search history.

(56) References Cited

U.S. PATENT DOCUMENTS 317,460 A * 5/1885 Joyner ................. B63H 25/382 16/229
353,007 A * 11/1886 Schubert et al. ..... E05D 7/1005 16/262

(Continued)

FOREIGN PATENT DOCUMENTS

GB 2391257 A * 2/2004 ........... E05D 15/264
JP H0949361 A * 2/1997
WO WO-0116450 A1 * 3/2001 ........... E05D 7/1011

OTHER PUBLICATIONS

U.S. Appl. No. 17/741,640, filed May 11, 2022.

*Primary Examiner* — Jeffrey O'Brien
(74) *Attorney, Agent, or Firm* — MaxGoLaw PLLC

(57) ABSTRACT

A releasable hinge assembly includes a mounting bracket, a hinge bracket, and at least one spring biased locking mechanism. The mounting bracket having a first mounting plate and two pin tabs extending therefrom, at least one of the pin tabs defining a through hole therein. The hinge bracket having a second mounting plate and a knuckle extending therefrom. The knuckle defining at least one cutout that is L-shaped. The at least one spring biased locking mechanism having a pawl arm and a pin. The at least one locking mechanism positioned within a channel of the hinge bracket with the pawl arm positioned within and projecting from the at least one cutout. The pawl arm configured to move within the at least one cutout to push the pin beyond a second end of the knuckle and through a through hole defined in the pin tab of the mounting bracket.

10 Claims, 11 Drawing Sheets

(56) References Cited

U.S. PATENT DOCUMENTS 771,654 A * 10/1904 Meek .................... E05D 7/1066 16/267
782,428 A * 2/1905 Struble et al. ........ E05D 7/1066 16/267
1,564,668 A * 12/1925 Hageman ................ D06F 81/06 16/229
1,904,110 A * 4/1933 Willmann ............. E05D 7/1005 16/229
2,186,789 A * 1/1940 Rosenberg .......... F24F 13/1486 16/229
2,618,809 A * 11/1952 Abraham .............. E05D 7/1066 16/267
3,488,793 A * 1/1970 Turpen ................... B62D 33/03 16/263
3,908,227 A * 9/1975 Cain ..................... E05D 7/1011 16/229
3,924,293 A * 12/1975 Cain ..................... E05D 7/1011 16/229
3,952,369 A * 4/1976 Erickson ................. D06F 39/14 16/265
3,977,044 A * 8/1976 Mort ..................... E05D 7/1011 16/380
4,455,711 A * 6/1984 Anderson ............. E05D 7/1011 16/229
4,482,023 A * 11/1984 Dziedzic ................... E05C 1/04 296/148
4,570,290 A * 2/1986 Anderson ............. E05D 7/1011 16/229
4,603,452 A * 8/1986 Paciorek ................... E05D 7/10 16/386
4,620,392 A * 11/1986 Kerpers ................ F25D 23/028 16/229
4,873,745 A * 10/1989 Ramsauer ............. E05D 7/1061 16/259
4,985,962 A * 1/1991 Weber ................... E05D 15/505 292/87
4,997,218 A * 3/1991 Culling ................. E05D 7/1016 292/DIG. 20
5,008,975 A * 4/1991 Wang ...................... E05D 7/081 16/386
5,016,949 A * 5/1991 Knurr ...................... H02B 1/38 312/329
5,274,882 A * 1/1994 Persson ............... H04M 1/0216 16/229
5,490,305 A * 2/1996 Domingo Ribot ...... E05D 7/081 16/229
5,659,928 A * 8/1997 Komaki ................ E05D 7/1016 16/338
5,697,121 A * 12/1997 Early .................... E05D 15/505 105/377.01
5,732,135 A * 3/1998 Weadon .............. H04M 1/0216 16/229
5,867,869 A * 2/1999 Garrett .................... E05D 15/54 16/334
5,881,150 A * 3/1999 Persson ................. H04M 1/035 16/229
5,940,934 A * 8/1999 Turner .................. E05D 7/1011 16/257
6,059,238 A * 5/2000 Reynolds ................. B60N 2/75 16/229
6,070,293 A * 6/2000 Schreiber .............. E05D 7/1011 16/229
6,205,616 B1 * 3/2001 Hwang ................. E05D 7/1011 16/229
6,233,784 B1 * 5/2001 Daoud .................. E05D 7/1077 16/229
6,317,928 B1 * 11/2001 Guillemette .......... E05D 7/1016 16/380
6,334,277 B1 * 1/2002 Condino ................... E06B 3/72 16/256
6,526,695 B1 * 3/2003 Nguyen .................... E05F 5/10 49/260
7,131,711 B2 * 11/2006 Chen ....................... G06F 1/181 312/223.2
7,380,314 B2 * 6/2008 Hung ........................ E05D 3/10 16/229
7,525,070 B2 * 4/2009 Gruaz .................. A47J 37/0611 219/524
7,582,850 B2 * 9/2009 Gruaz ................... E05D 7/1011 219/486
7,594,575 B2 * 9/2009 Choi .................. G11B 33/0422 16/257
8,272,101 B2 * 9/2012 Wagner ..................... E05D 3/08 16/365
8,745,824 B2 * 6/2014 Holstensson ............. E05D 3/12 16/259
8,756,761 B2 * 6/2014 Barquet ................ E05D 7/1016 16/374
11,214,998 B2 * 1/2022 Patil ........................ D06F 39/14
11,629,536 B2 * 4/2023 Maskara ................... E05D 1/06 16/254
2001/0045299 A1 * 11/2001 Miyamoto ........... H05K 5/0017 174/66
2007/0089269 A1 * 4/2007 Shen ......................... E05D 5/06 16/268
2011/0035901 A1 * 2/2011 Deveze ................... E06B 7/362 16/82
2012/0096677 A1 * 4/2012 Ho .......................... E05D 7/105 16/250
2012/0151716 A1 * 6/2012 Holstensson ........... E05D 11/04 16/224
2013/0042432 A1 * 2/2013 Andrews ............... E05F 1/1253 16/50
2013/0111706 A1 * 5/2013 Anderson ............. E05D 11/087 16/342
2021/0196085 A1 * 7/2021 Placencia .............. E05D 7/1072
2022/0097612 A1 * 3/2022 Vemulapati ............. E05C 9/042

* cited by examiner

RELEASABLE HINGE ASSEMBLY

CROSS REFERENCE TO RELATED APPLICATIONS

This application is a divisional application of U.S. Utility application Ser. No. 17/741,640, filed 11 May 2022, which in turn claims priority benefit of U.S. Provisional Application Ser. No. 63/213,822, filed 23 Jun. 2021, the contents of which are hereby incorporated by reference.

FIELD OF THE INVENTION

The present invention in general relates to a hinge assembly and, more particularly to a tool-free releasable hinge assembly for vehicle windows.

BACKGROUND OF THE INVENTION

Various vehicle components are pivotally coupled to a vehicle body using hinges. Given the limitations of existing hinges, many of these vehicle components only open 90° or less and are otherwise permanently attached to the vehicle body unless the hinge is removed from the vehicle body, the vehicle component, or both using tools and risking damage. Accordingly, the use of such hinges on vehicle components is generally limited to applications such as vehicle doors, hoods, and trunks.

However, as vehicles with increased configurability, modularity, and functionality, especially for sport utility vehicles (SUV), trucks, and vans become increasingly popular, hinged vehicle components offer a substantial opportunity for increased vehicle configurability, modularity, and functionality as well as vehicle weight savings which leads to increased fuel efficiency; however, the limitations of existing hinges currently stand in the way of such advancements.

Thus, there exists a need for an improved hinge, such as a releasable hinge for vehicle components that facilitates increased vehicle configurability, modularity, and functionality.

SUMMARY OF THE INVENTION

The present invention provides a releasable hinge assembly that includes a mounting bracket, a hinge bracket, and at least one spring biased locking mechanism. The releasable hinge assembly configured to pivotally couple components together while also allowing the components to be totally separated from one another when desired. According to embodiments, the releasable hinge assembly pivotally couples a vehicle component to a vehicle body while allowing the vehicle component to be entirely removed from the vehicle body when desired without the use of tools, thereby providing increased vehicle configurability, modularity, and functionality. Furthermore, the releasable hinge assembly, once installed, is easily operated by a single user without the use of tools.

According to embodiments, the mounting bracket includes a first mounting plate and two pin tabs extending from the first mounting plate, a first of the two pin tabs having a first pin extending therefrom and a second of the two pin tabs defining a through hole therein. The hinge bracket includes a second mounting plate and a knuckle extending therefrom, the knuckle having a wall that defines a pin channel therein, the wall of the knuckle defining a first cutout at a first end of the knuckle configured to receive the first pin into the pin channel, the wall of the knuckle further defining a second cutout near a second end of the knuckle, the second cutout being L-shaped. The spring biased locking mechanism includes a pawl arm and a second pin, the locking mechanism positioned within the pin channel of the hinge bracket with the pawl arm positioned within and projecting from the second cutout and the second pin being coaxial within the pin channel, the pawl arm configured to move within the second cutout to push the second pin beyond the second end of the knuckle and through the through hole defined in the second pin tab of the mounting bracket.

According to embodiments, the mounting bracket includes a first mounting plate and two pin tabs extending from the first mounting plate, the two pin tabs each defining a through hole therein. The hinge bracket includes a second mounting plate and a knuckle extending therefrom, the knuckle having a wall that defines a first cutout near a first end of the knuckle and a second cutout near a second end of the knuckle, the first cutout and the second cutout each being L-shaped. The plurality of spring biased locking mechanisms each having a pawl arm and a pin, the plurality of locking mechanisms positioned within a pin channel of the hinge bracket with the pawl arm of a first of the spring biased locking mechanisms positioned within and projecting from the first cutout and the pin thereof being coaxial within the pin channel and with the pawl arm of a second of the spring biased locking mechanisms positioned within and projecting from the second cutout and the pin thereof being coaxial within the pin channel, the pawl arm of the first spring biased locking mechanisms configured to move within the first cutout to push the pin thereof beyond the first end of the knuckle and through the through hole defined in the first pin tab of the mounting bracket and the pawl arm of the second spring biased locking mechanisms configured to move within the second cutout to push the pin thereof beyond the second end of the knuckle and through the through hole defined in the second pin tab of the mounting bracket.

BRIEF DESCRIPTION OF THE DRAWINGS

The present invention is further detailed with respect to the following drawings that are intended to show certain aspects of the present invention but should not be construed as a limit on the practice of the present invention.

DESCRIPTION OF THE INVENTION

Figure 1:
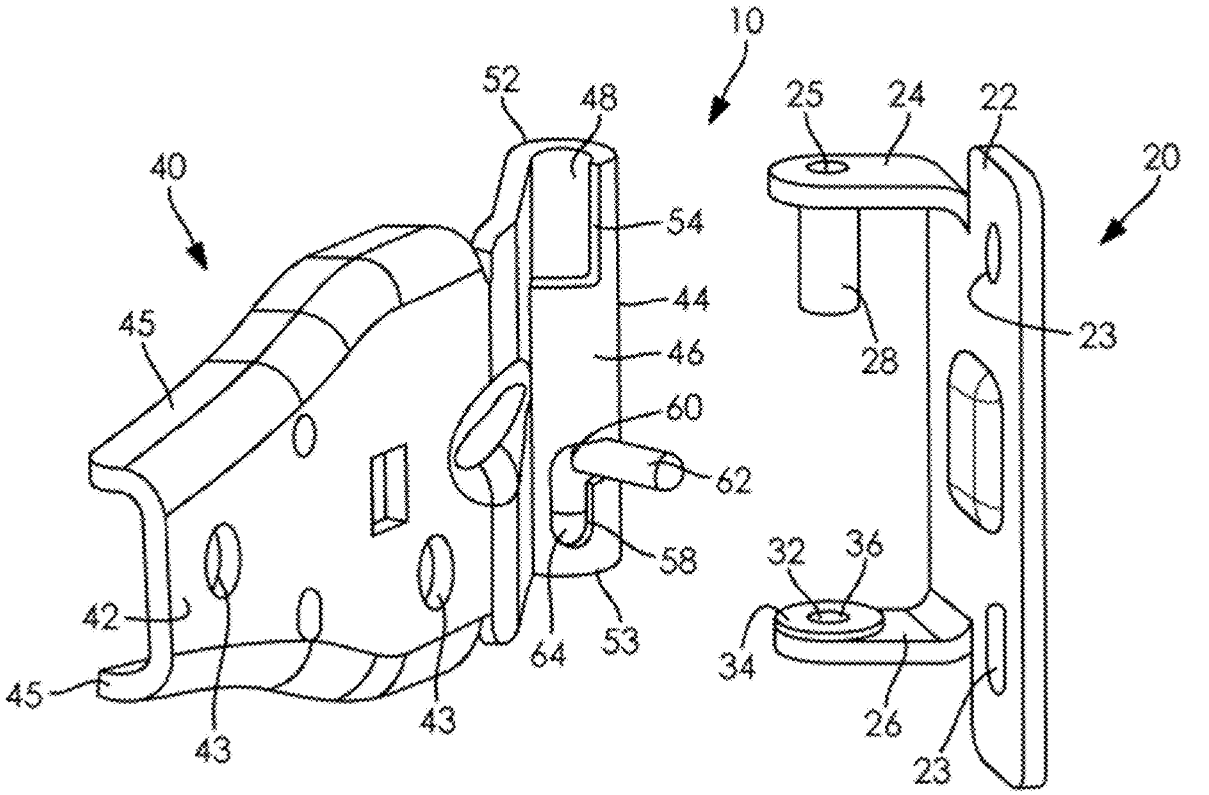
FIG. 1 is a side perspective view of a releasable hinge assembly according to embodiments of the present disclosure with a mounting bracket separated from a hinge bracket.

The present invention has utility as a releasable hinge assembly for pivotally coupling components together while also allowing the components to be totally separated from one another when desired. According to embodiments, the inventive releasable hinge assembly pivotally couples a vehicle component to a vehicle body while allowing the vehicle component to be entirely removed from the vehicle body when desired without the use of tools, thereby providing increased vehicle configurability, modularity, and functionality. The inventive releasable hinge assembly, once installed, is easily operated by a single user without the use of tools.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Referring now to the figures, embodiments of a releasable hinge assembly 10 include a mounting bracket 20, a hinge bracket 40, and at least one spring biased locking mechanism 60, 60'. According to embodiments, the mounting bracket 20 is configured to be attached to a fixed surface while the hinge bracket 40 is configured to be attached to a component designed to be pivotally coupled to the fixed surface. In FIGS. 1-7, the brackets 20, 40 are not attached to any surfaces for visual clarity.

As shown throughout the figures, the mounting bracket 20 includes a first mounting plate 22 and two pin tabs 24, 26 extending from the first mounting plate 22. According to embodiments, the first mounting plate 22 defines a plurality of through holes 23 therein, which are configured to receive fasteners (not shown) for securing the mounting bracket 20 to a surface. According to further embodiments, the first mounting plate 22 of the mounting bracket 20 is secured to a surface by an adhesive, by welding, or any other suitable means. According to embodiments, the first mounting plate 22 is planar, however, other configurations are contemplated. According to embodiments, the pin tabs 24, 26 extend perpendicularly from the first mounting plate 22, but other angles are also contemplated. According to further embodiments, the pin tabs 24, 26 are positioned parallel to one another, however other relative positions are also contemplated. According to embodiments, the first pin tab 24 defines a through hole 25 therethrough. The second pin tab 26 defines a through hole 32 therethrough. According to embodiments, the through hole 32 defined in the second pin tab 26 is coaxial with the through hole 25 that is defined in the first pin tab 24.

According to embodiments, the first mounting plate 22 and the two pin tabs 24, 26 are integrally formed, for example by stamping and bending processes, by injection molding, by a casting process, or by additive manufacturing such as 3D printing. According to further embodiments, the first mounting plate 22 and the two pin tabs 24, 26 are separately formed and subsequently attached together, for example by an adhesive, by fusing, or by welding. According to embodiments, the mounting bracket 20 is formed of a metal material, such as steel, aluminum, brass, bronze, or other metal alloys, or a polymer material, such as nylon (polyamide), acrylic, polycarbonate, polyoxymethylene (POM), polystyrene (PS), Acrylonitrile Butadiene Styrene (ABS), polypropylene (PP), polyethylene (PE), or combinations thereof.

Figure 2:
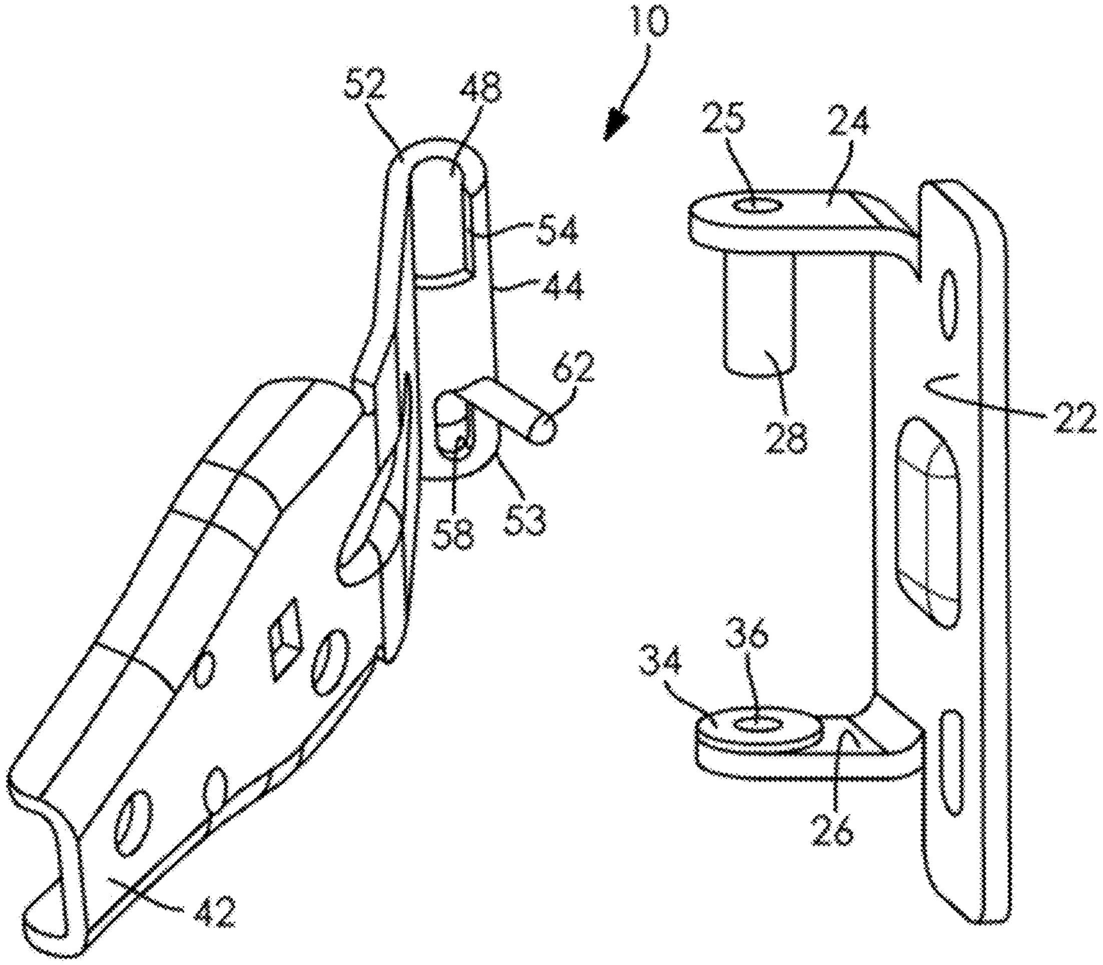
FIG. 2 is top perspective view of the releasable hinge assembly according to embodiments of the present disclosure with a mounting bracket separated from a hinge bracket.

According to embodiments, such as those shown in FIGS. 1-8, a first pin 28 extends from the first pin tab 24. As shown in FIGS. 1 and 2, the first pin 28 extends from the first pin tab 24 toward the second pin tab 26, such that the first pin 28 is positioned between the first pin tab 24 and the second pin tab 26. However, it is noted that the first pin 28 does not extend from the first pin tab 24 to the second pin tab 26. Additionally, as shown throughout the figures, the first pin 28 is cylindrical in shape. According to embodiments, the first pin 28 is integrally formed with the first pin tab 24. According to further embodiments, the first pin 28 is attached to a through hole 25 that is defined in the first pin tab 24, for example by a fastener, by an adhesive, by a friction fit, or by any other suitable means. According to embodiments, the through hole 32 defined in the second pin tab 26 is coaxial with the first pin 28 that extends from the first pin tab 24. According to embodiments, the first pin 28 is formed of a metal material, such as steel, aluminum, brass, bronze, or other metal alloys, or a polymer material, such as nylon (polyamide), acrylic, polycarbonate, polyoxymethylene (POM), polystyrene (PS), Acrylonitrile Butadiene Styrene (ABS), polypropylene (PP), polyethylene (PE), or combinations thereof.

According to embodiments, a collar 34 is seated within the through hole 32 defined in the second pin tab 26. As shown in the figures, the collar 34 defines a through hole 36 therein. According to embodiments, the collar 34 is coaxial with the through hole 32 defined in the second pin tab 26. According to embodiments, the collar 34 is formed of a metal material, a polymer material, or a rubber material.

According to embodiments such as those shown in FIGS. 1-8, the hinge bracket 40 of the inventive releasable hinge assembly 10 includes a second mounting plate 42 and a knuckle 44 extending therefrom. The knuckle 44 is formed of a wall 46 that defines a cylindrical pin channel 48 therein. At a first end 52 of the knuckle 44, a first cutout 54 is defined through the wall 46 of the knuckle 44. The first cutout 54 has a shape that corresponds to the shape of the first pin 28. The first cutout 54 is configured to receive the first pin 28 into the pin channel 48. Furthermore, near a second end 53 of the knuckle 44, a second cutout 58 is defined through the wall 46 of the knuckle 44. The second cutout 58 has an L-shape, as shown in FIGS. 1, 3, 6, and 7, which retains the pawl arm 62 in the engaged and disengaged positions, respectively, as described below.

According to embodiments, the second mounting plate 42 defines a plurality of through holes 43 therein, which are configured to receive fasteners (not shown) for securing the hinge bracket 40 to a surface. According to further embodiments, the second mounting plate 42 of the hinge bracket 40 is secured to a surface by an adhesive, by welding, or any other suitable means. According to embodiments, the second mounting plate 42 is planar, however, other configurations are contemplated. According to embodiments, the second mounting plate 42 includes two flanges 45 extending therefrom.

According to embodiments, the second mounting plate 42 and the knuckle 44 are integrally formed, for example by stamping and bending processes, by injection molding, or by additive manufacturing such as 3D printing. According to further embodiments, the second mounting plate 42 and the knuckle 44 are separately formed and subsequently attached together, for example by an adhesive, by fusing, or by welding. According to embodiments, the hinge bracket 40 is formed of a metal material, such as steel, aluminum, brass, bronze, or other metal alloys, or a polymer material, such as nylon (polyamide), acrylic, polycarbonate, polyoxymethylene (POM), polystyrene (PS), Acrylonitrile Butadiene Styrene (ABS), polypropylene (PP), polyethylene (PE), or combinations thereof.

The spring biased locking mechanism 60 of the inventive releasable hinge assembly 10 includes a pawl arm 62 and a second pin 64. According to embodiments, pawl arm 62 and the second pin 64 of the spring biased locking mechanism 60 are integrally formed, while according to other embodiments, the pawl arm 62 and the second pin 64 of the spring biased locking mechanism 60 are formed as two separate parts. According to embodiments, the spring biased locking mechanism 60 is formed of a metal material, such as steel, aluminum, brass, bronze, or other metal alloys, or a polymer material, such as nylon (polyamide), acrylic, polycarbonate, polyoxymethylene (POM), polystyrene (PS), Acrylonitrile Butadiene Styrene (ABS), polypropylene (PP), polyethylene (PE), or combinations thereof. As shown throughout the figures, the locking mechanism 60 is positioned within the pin channel 48 of the hinge bracket 40 with the pawl arm 62 positioned within and projecting from the second cutout 58 and the second pin 64 being coaxial within the pin channel 48. The pawl arm 62 is configured to move within the second cutout 58 to push the second pin 64 beyond the second end 53 of the knuckle 44 and through the through hole 32 defined in the second pin tab 26 of the mounting bracket 20 and through the through hole 36 defined in the collar 34. According to embodiments, the spring biased locking mechanism 60 is biased to push the second pin 64 toward the second end 53 of the knuckle 44.

As shown in FIGS. 1 and 2, the mounting bracket 20 and the hinge bracket 40 are separated from each other. In FIGS. 1 and 2, the brackets 20, 40 are not attached to any surfaces for visual clarity. Notably, in the separated or released state shown in FIGS. 1 and 2 where the mounting bracket 20 and the hinge bracket 40 are separated from each other, the pawl arm 62 is held in the disengaged position within the L-shaped second cutout 58 in the knuckle 44, thereby holding the second pin 64 within the pin channel 48 of the knuckle 44 such that the second pin 64 does not extend beyond the second end 53 of the knuckle 44.

Figure 3:
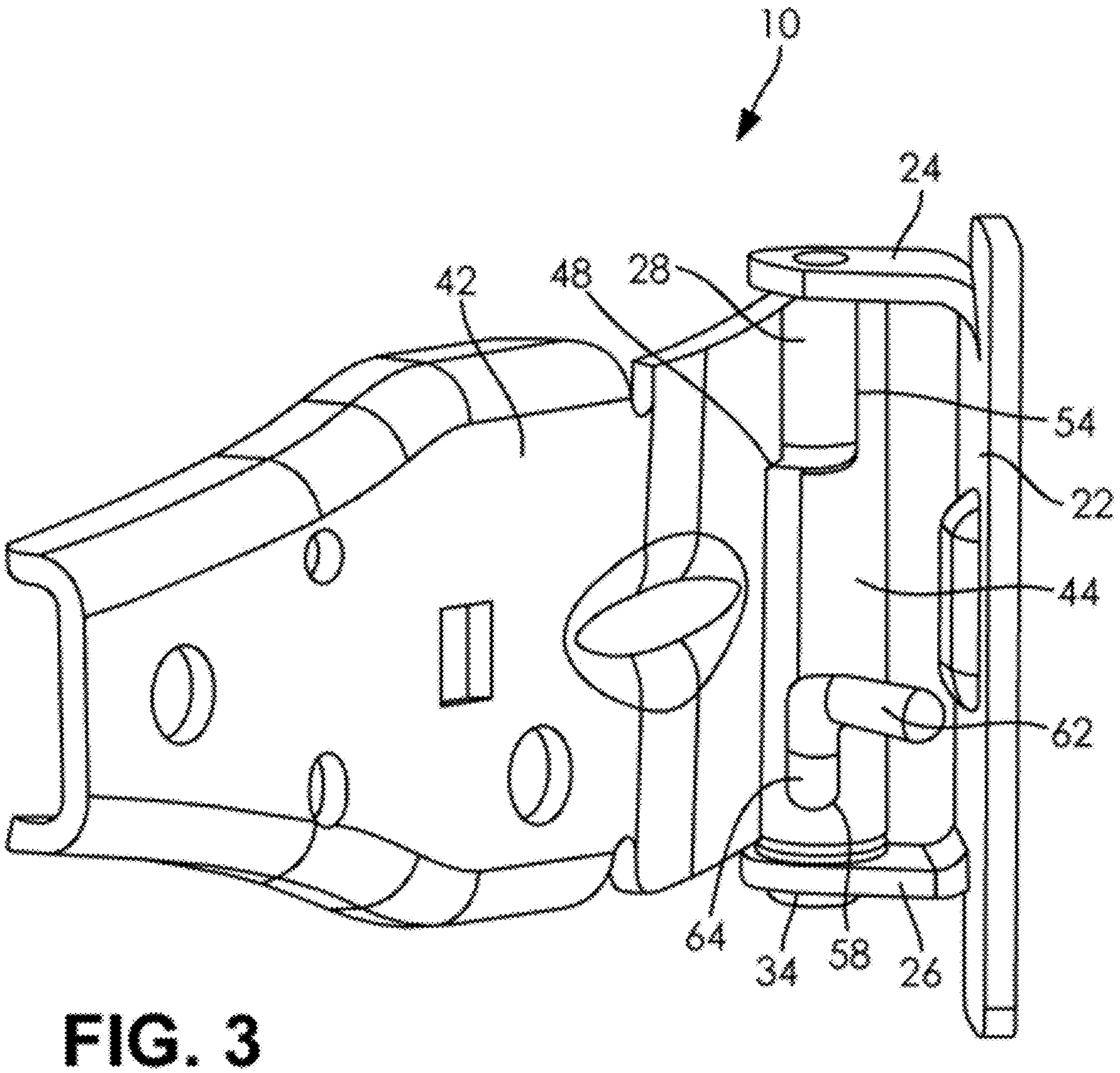
FIG. 3 is a side perspective view of the releasable hinge assembly according to embodiments of the present disclosure with a mounting bracket in contact with a hinge bracket in a disengaged position.

In FIG. 3, the first pin 28 is inserted into the cylindrical pin channel 48 of the knuckle 44 through the first cutout 54 and the second end 53 of the knuckle 44 is aligned with the second pin tab 26 such that the through hole 32 defined in the second pin tab 26 is coaxial with the pin channel 48 of the knuckle 44. Notably, in FIG. 3, the mounting bracket 20 and the hinge bracket 40 have been brought together in alignment but have not been pivoted toward each other.

Figure 4:
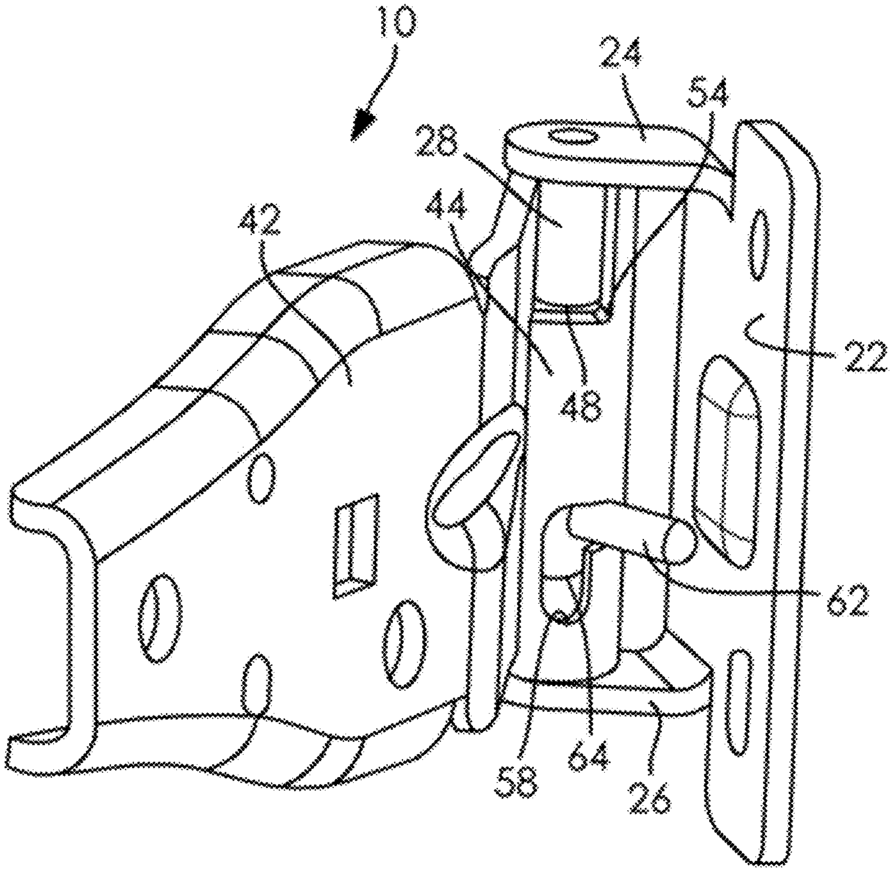
FIG. 4. is a top perspective view of the releasable hinge assembly according to embodiments of the present disclosure with a mounting bracket in contact with a hinge bracket in a disengaged position.
Figure 5:
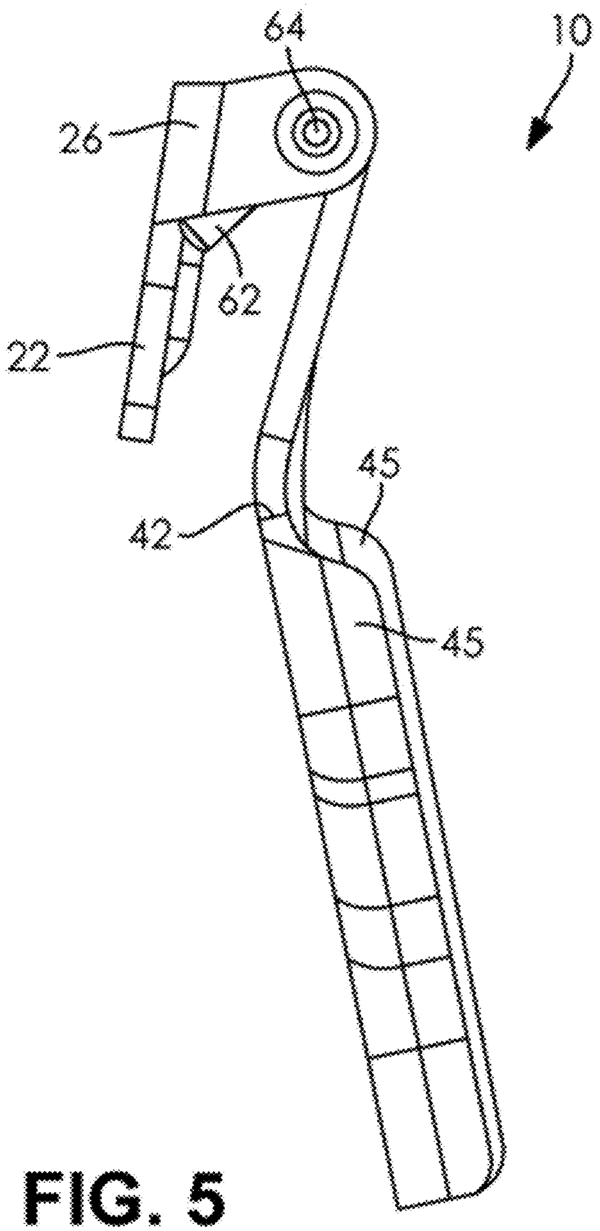
FIG. 5 is a side view of the releasable hinge assembly according to embodiments of the present disclosure with a mounting bracket in contact with a hinge bracket in the process of locking.
Figure 6:
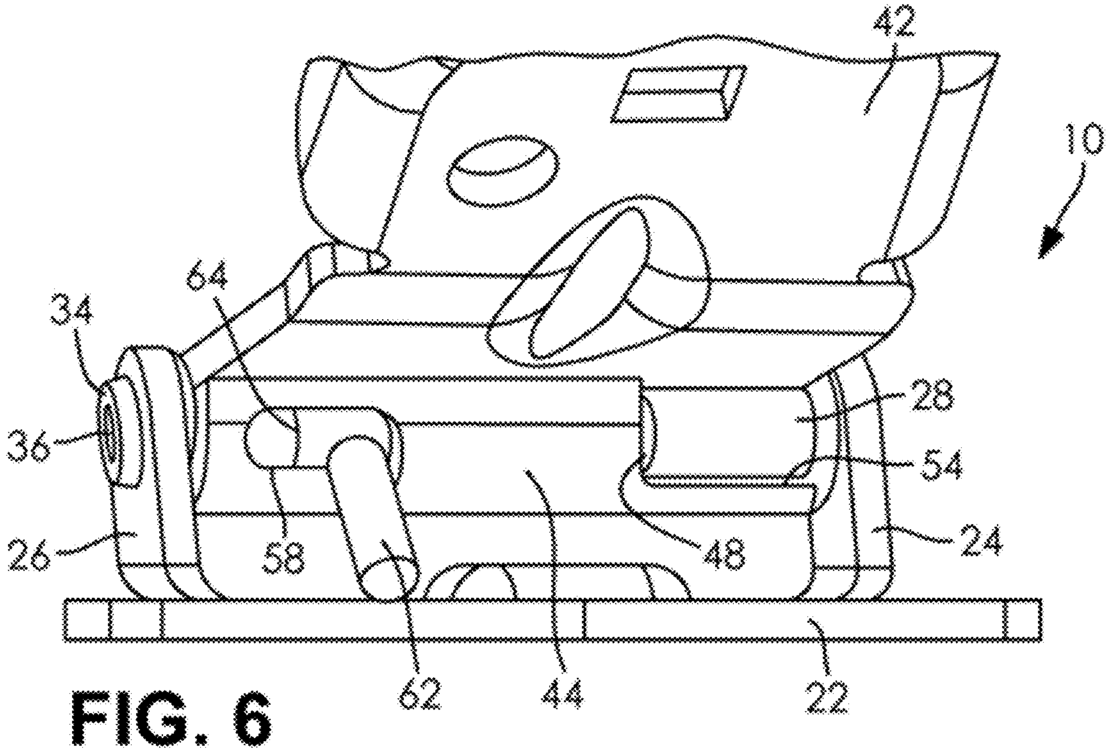
FIG. 6 is a perspective view of the releasable hinge assembly according to embodiments of the present disclosure with a mounting bracket in contact with a hinge bracket in the process of locking.
Figure 7:
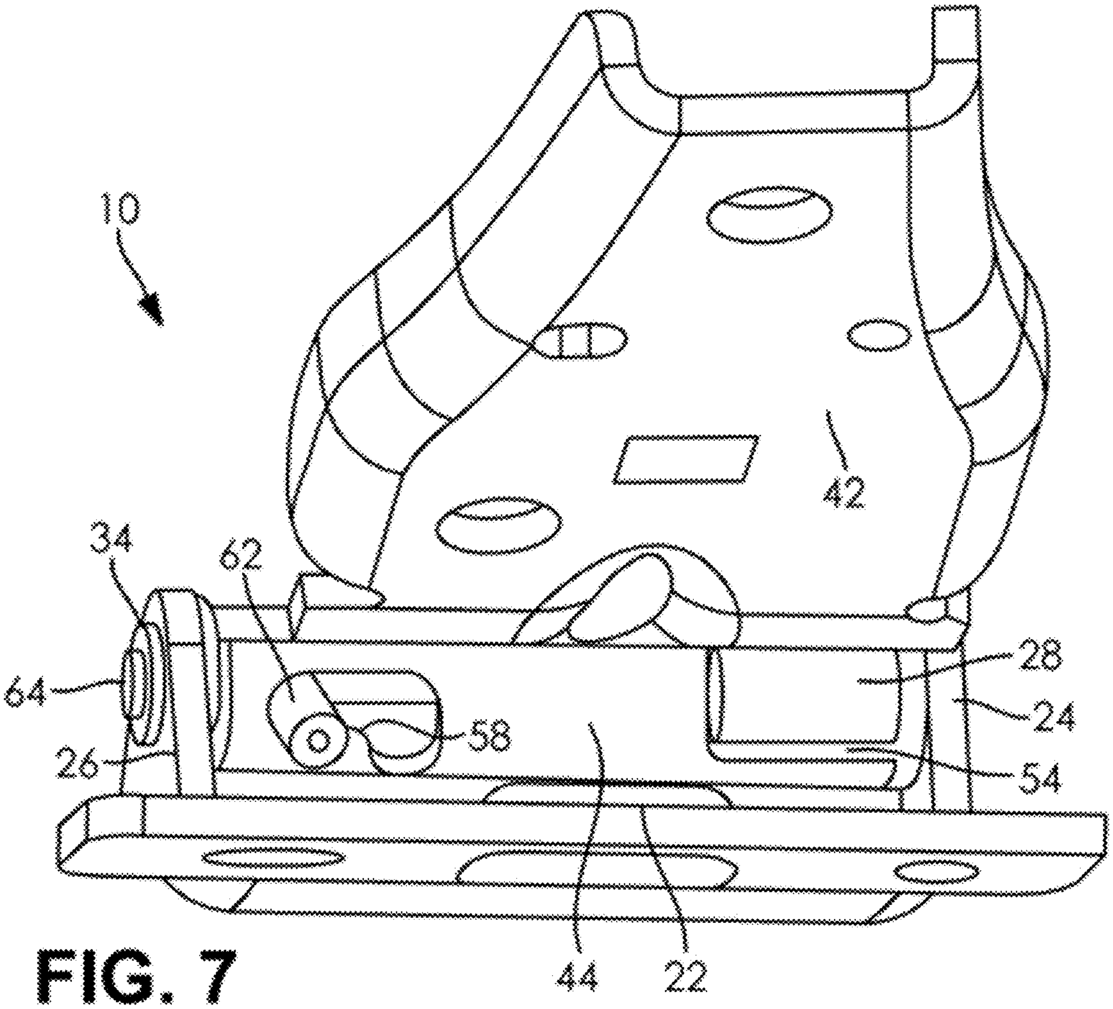
FIG. 7 is a top perspective view of the releasable hinge assembly according to embodiments of the present disclosure with a mounting bracket in contact with a hinge bracket in an engaged position.

Next, as shown in FIG. 4, the hinge bracket 40 is pivoted toward the mounting bracket 20 with the knuckle 44 of the hinge bracket 40 rotating on the first pin 28 within the cylindrical pin channel 48. As the hinge bracket 40 is brought closer to the mounting bracket 20, the pawl arm 62 contacts the first mounting plate 22, which applies an opposite force to the pawl arm 62 thereby pushing the pawl arm 62 within the second cutout 58 in the knuckle 44. Given the spring bias of the locking mechanism 60 that urges the locking mechanism 60 toward the second end 53 of the knuckle 44, when the pawl arm 62 is pushed enough such that the second cutout 58 no longer restrains the spring bias of the locking mechanism 60, the locking mechanism moves toward the second end 53 of the knuckle 44, thereby urging the second pin 64 beyond the second end 53 of the knuckle 44 and through the through hole 32 defined in the second pin tab 26, as shown in FIG. 7.

Figure 8:
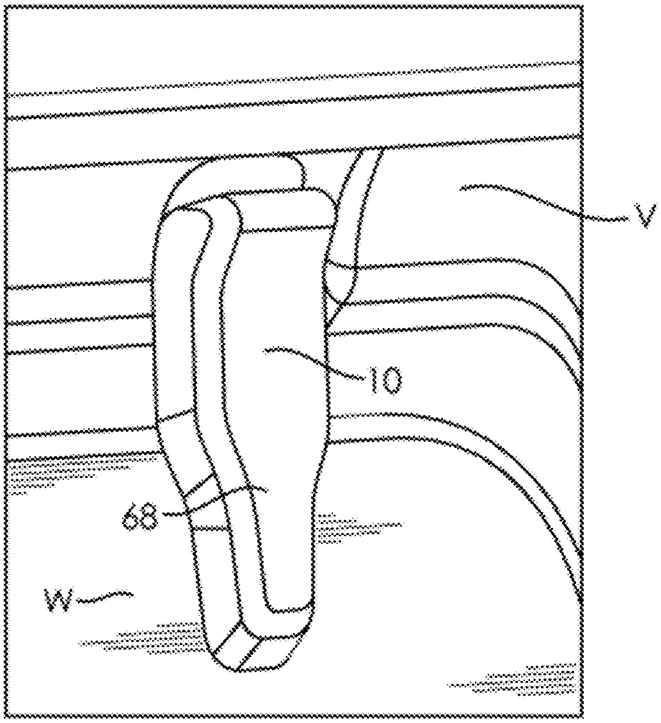
FIG. 8 shows the releasable hinge assembly according to embodiments of the present disclosure installed between a vehicle and a vehicle window.
Figure 9:
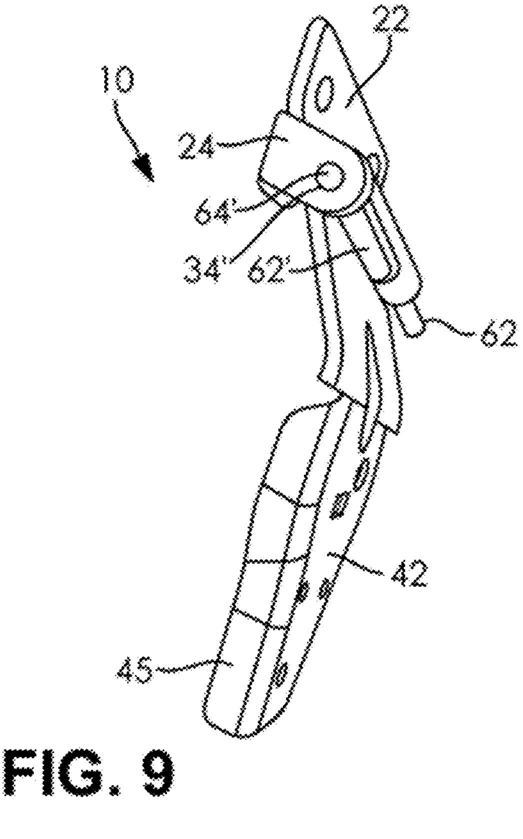
FIG. 9 is a top perspective view of a releasable hinge assembly according to embodiments of the present disclosure with a mounting bracket in contact with a hinge bracket in an engaged position.
Figure 10:
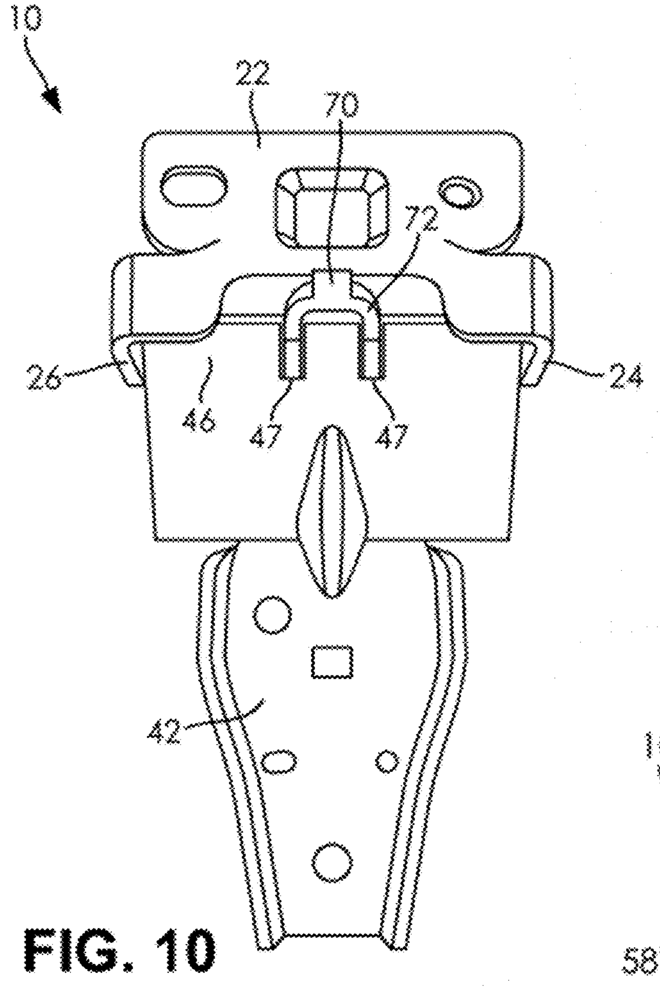
FIG. 10 is a rear view the releasable hinge assembly of FIG. 9 with a mounting bracket in contact with a hinge bracket in an engaged position.

To release the components of the releasable hinge assembly 10, the pawl arm 62 is pushed within the L-shaped second cutout 58 in the knuckle 44 toward the first pin tab 24 and into the released position within the L-shaped second cutout 58 wherein the L-shaped second cutout 58 holds the pawl arm 62 in resistance to the spring bias. Then the hinge bracket 40 may be separated from the mounting bracket 20. According to embodiments, the pawl arm 62 of the locking mechanism 60 is hidden from view and inaccessible when a window to which it is attached is closed, thus providing a security feature. According to embodiments, the releasable hinge assembly 10 includes a cover 68, as shown in FIG. 8, that protects the hinge assembly 10 and specifically the locking mechanism 60 while also providing an aesthetically appealing appearance.

According to further embodiments, such as those shown in FIGS. 9-14, the first pin tab 24 and the second pin tab 26 are symmetrical, that is, the first pin tab 24 does not include a first pin 28 extends therefrom as described above with reference to FIGS. 1-8. Instead, as shown in FIGS. 9-14 and as described above, the mounting bracket 20 includes a first mounting plate 22 and two pin tabs 24, 26 extending from the first mounting plate 22. According to embodiments, the first mounting plate 22 defines a plurality of through holes 23 therein, which are configured to receive fasteners (not shown) for securing the mounting bracket 20 to a surface. According to further embodiments, the first mounting plate 22 of the mounting bracket 20 is secured to a surface by an adhesive, by welding, or any other suitable means. According to embodiments, the first mounting plate 22 is planar, however, other configurations are contemplated. According to embodiments, the pin tabs 24, 26 extend perpendicularly from the first mounting plate 22, but other angles are also contemplated. According to further embodiments, the pin tabs 24, 26 are positioned parallel to one another, however other relative positions are also contemplated. According to embodiments, the first pin tab 24 defines a through hole 25 therethrough. The second pin tab 26 defines a through hole 32 therethrough. According to embodiments, the through hole 32 defined in the second pin tab 26 is coaxial with the through hole 25 that is defined in the first pin tab 24.

According to embodiments, such as those shown in FIGS. 9-14, a fork 70 extends from the first mounting plate 22 between the first pin tab 24 and the second pin tab 26. According to embodiments, the fork 70 is positioned at the center of the first mounting plate 22. The fork 70 includes two opposing prongs 72 that each define a through hole or a cutout therein. The fork 70, prongs 72, and through holes or cutouts are used for locating and holding the mounting bracket 20 relative to the hinge bracket 40, as will be described below.

According to embodiments, the first mounting plate 22, the two pin tabs 24, 26, and the fork 70 are integrally formed, for example by stamping and bending processes, by injection molding, by a casting process, or by additive manufacturing such as 3D printing. According to further embodiments, the first mounting plate 22, the two pin tabs 24, 26, and the fork 70 are separately formed and subsequently attached together, for example by an adhesive, by fusing, or by welding. According to embodiments, the mounting bracket 20 is formed of a metal material, such as steel, aluminum, brass, bronze, or other metal alloys, or a polymer material, such as nylon (polyamide), acrylic, polycarbonate, polyoxymethylene (POM), polystyrene (PS), Acrylonitrile Butadiene Styrene (ABS), polypropylene (PP), polyethylene (PE), or combinations thereof.

According to embodiments, a collar 34 is seated within the through hole 32 defined in the second pin tab 26 and a second collar 34' is seated within the through hole 25 defined in the first pin tab 24. As shown in the figures, the collars 34, 34' each define a through hole 36, 36' therein. According to embodiments, the collar 34 is coaxial with the through hole 32 defined in the second pin tab 26 while the second collar 34' is coaxial with the through hole 25 defined in the first pin tab 24. According to embodiments, the collars 34, 34' are formed of a metal material, a polymer material, or a rubber material.

Figure 11:
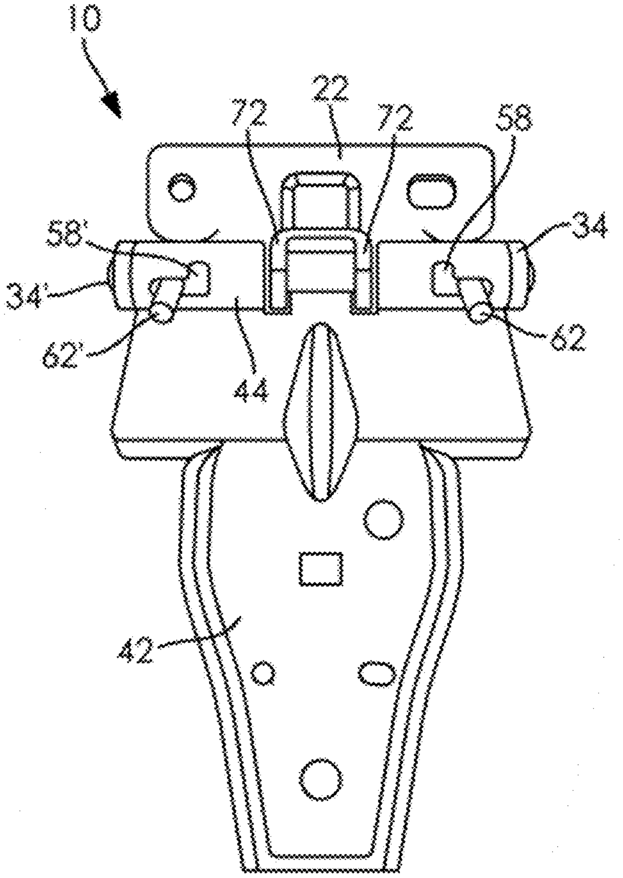
FIG. 11 is a front view the releasable hinge assembly of FIG. 9 with a mounting bracket in contact with a hinge bracket in an engaged position.
Figure 12:
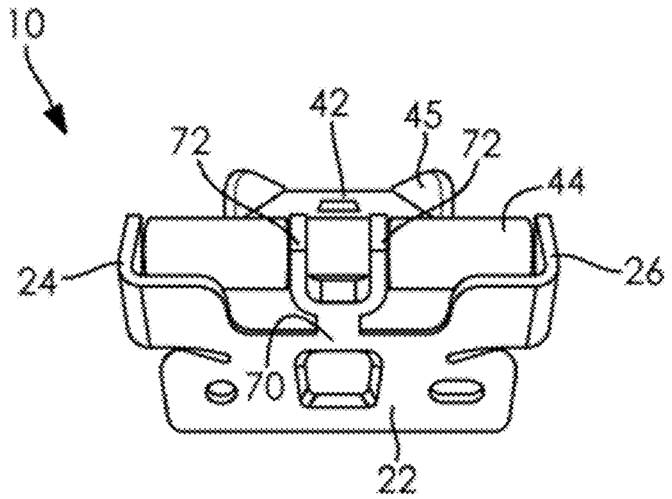
FIG. 12 is a rear view the releasable hinge assembly of FIG. 9 with a mounting bracket in contact with a hinge bracket in an engaged position.
Figure 13:
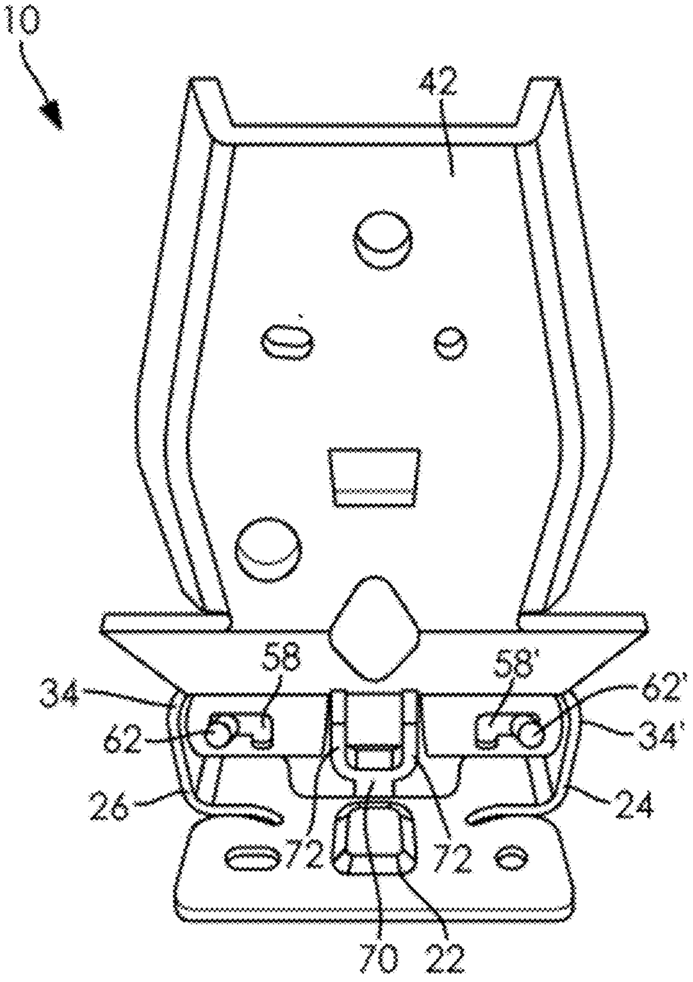
FIG. 13 is a front view the releasable hinge assembly of FIG. 9 with a mounting bracket in contact with a hinge bracket in an engaged position.
Figure 14:
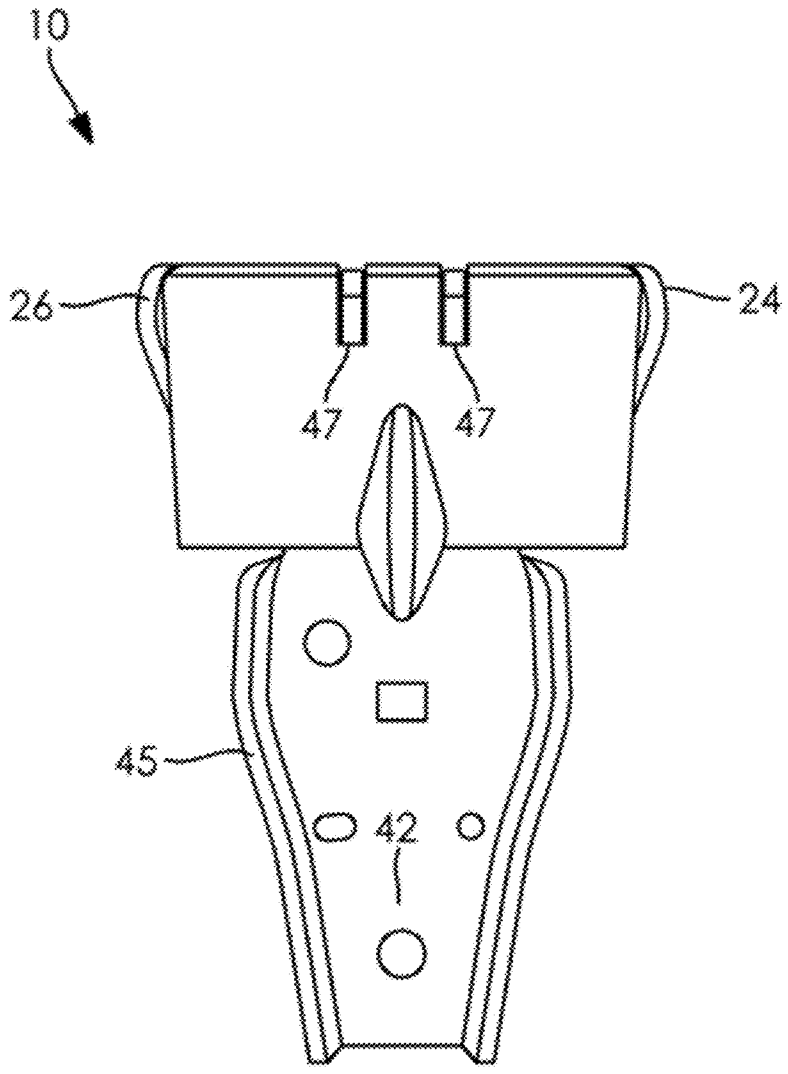
FIG. 14 is a rear view the releasable hinge assembly of FIG. 9 with a mounting bracket in contact with a hinge bracket in an engaged position.

According to embodiments such as those shown in FIGS. 9-14, the hinge bracket 40 of the inventive releasable hinge assembly 10 includes a second mounting plate 42 and a knuckle 44 extending therefrom. The knuckle 44 is formed of a wall 46 that defines two channels 47 therein that are configured to receive the prongs 72 of the fork 70. The channels 47 are positioned near the center of the knuckle 44. Near a first end 52 of the knuckle 44, a first cutout 58' is defined through the wall 46 of the knuckle 44, while near a second end 53 of the knuckle 44, a second cutout 58 is defined through the wall 46 of the knuckle 44. The cutouts 58, 58' have an L-shape, as shown in FIGS. 11 and 13, which are configured to retain the pawl arm 62, 62' in the engaged and disengaged positions, respectively, as described below.

According to embodiments, the second mounting plate 42 defines a plurality of through holes 43 therein, which are configured to receive fasteners (not shown) for securing the hinge bracket 40 to a surface. According to further embodiments, the second mounting plate 42 of the hinge bracket 40 is secured to a surface by an adhesive, by welding, or any other suitable means. According to embodiments, the second mounting plate 42 is planar, however, other configurations are contemplated. According to embodiments, the second mounting plate 42 includes two flanges 45 extending therefrom.

According to embodiments, the second mounting plate 42 and the knuckle 44 are integrally formed, for example by stamping and bending processes, by injection molding, casting, or by additive manufacturing such as 3D printing. According to further embodiments, the second mounting plate 42 and the knuckle 44 are separately formed and subsequently attached together, for example by an adhesive, by fusing, or by welding. According to embodiments, the hinge bracket 40 is formed of a metal material, such as steel, aluminum, brass, bronze, or other metal alloys, or a polymer material, such as nylon (polyamide), acrylic, polycarbonate, polyoxymethylene (POM), polystyrene (PS), Acrylonitrile Butadiene Styrene (ABS), polypropylene (PP), polyethylene (PE), or combinations thereof.

According to embodiment, such as those shown in FIGS. 9-14, the inventive releasable hinge assembly 10 includes two spring biased locking mechanisms 60, 60', which each includes a pawl arm 62, 62' and a second pin 64, 64'. According to embodiments, pawl arms 62, 62' and the second pins 64, 64' of the spring biased locking mechanism 60, 60' are integrally formed, while according to other embodiments, they are separate parts. According to embodiments, the spring biased locking mechanism 60, 60' is formed of a metal material, such as steel, aluminum, brass, bronze, or other metal alloys, or a polymer material, such as nylon (polyamide), acrylic, polycarbonate, polyoxymethylene (POM), polystyrene (PS), Acrylonitrile Butadiene Styrene (ABS), polypropylene (PP), polyethylene (PE), or combinations thereof. As shown throughout FIGS. 9-14, the locking mechanisms 60, 60' are positioned within the pin channel 48 of the hinge bracket 40 with the pawl arms 62, 62' positioned within and projecting from the cutouts 58, 58' and the second pins 64, 64' being coaxial within the pin channel 48. The pawl arms 62, 62' are configured to move within the respective cutouts 58, 58' to push the second pins 64, 64' beyond the respective ends 52, 53 of the knuckle 44 and through the respective through holes 25, 32 defined in the first pin tab 24 and the second pin tab 26, respectively, of the mounting bracket 20 and through the respective through holes 36, 36' defined in the respective collars 34, 34'. According to embodiments, the spring biased locking mechanisms 60, 60' are biased to push the second pins 64, 64' toward the respective ends 52, 53 of the knuckle 44. The operation of the spring biased locking mechanisms 60, 60' in the embodiments shown in FIG. 9-14 is the same as that described above regarding the operation of the spring biased locking mechanism 60 of the embodiments of FIGS. 1-8.

According to embodiments, the mounting bracket 20 is configured to be attached to a fixed surface while the hinge bracket 40 is configured to be attached to a component designed to be pivotally coupled to the fixed surface. According to embodiments, the fixed surface is a vehicle, and more particularly to a vehicle frame or body panel, while the component designed to be pivotally coupled to the fixed surface is a vehicle window, vehicle panel, or a vehicle door.

The inventive releasable hinge assembly 10 is thus useful for providing increased vehicle configurability, modularity, and functionality. For example, not only can a door, liftgate, panel, or window W, as shown in FIG. 8 with an aesthetic and protective cover 68 provided thereon, pivotally coupled to a vehicle V using an embodiment of the inventive releasable hinge assembly 10 be pivotally moved relative to the vehicle, for example to open the door, liftgate, panel, or window, but the pivotally coupled component can be removed from the vehicle for better access, for cleaning, to give the car a more open, convertible-like feel, or to make more room for storing and transporting large, cumbersome items such as lumber or bicycles. Additionally, a panel or window pivotally coupled to a vehicle V using an embodiment of the inventive releasable hinge assembly 10 may be removed from the vehicle to create a temporary pass-through or open access point, which may be useful for situations such as tailgating, car camping, or other similar situations in which items may frequently be retrieved from or placed into the interior of the vehicle. Additionally, such a temporary pass-through may be extremely useful for vehicles such as food trucks or as an escape hatch or emergency exit from a vehicle such as a bus, a train, a subway, an airplane, or recreational vehicle, allowing passengers to quickly and easily remove the hinged panel or window and safely escape the vehicle. As yet another example, a panel mounted to a vehicle using an embodiment of the inventive releasable hinge assembly 10 may be used as a secure closure for a storage compartment, for example within a truck bed, on an airplane, on a boat, on a house, on a recreational vehicle, on a patio, on a camper, or on a portable storage container such as a car top luggage carrier. The inventive releasable hinge assembly 10 also has uses unrelated to vehicles. That is, the inventive releasable hinge assembly 10 may be used with toilet seats; appliances having doors, such as refrigerators, ovens, and microwaves; sporting activities, such as lane dividers for shooting sports; doors on pet carriers or pet houses; doors or shutters on a house, for example with hurricane shutters to protect home windows from being broken by debris or as security shutters to protect the home from invasion, for example when occupants will be away from the home for an extended period of time.

Once removed from the fixed structure, the removed hinged component may be stored in a location remote from the fixed structure, such as in a garage or shed, or may be stored within a vehicle, such as in the trunk or in a designated storage compartment. According to embodiments, the releasable hinge assembly 10 is configured to be released and reassembled by a single use and/or without the use of tools.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A releasable hinge assembly comprising:

a mounting bracket having a first mounting plate and two pin tabs extending from the first mounting plate, a first of the two pin tabs having a first pin extending therefrom and a second of the two pin tabs defining a through hole therein;

a hinge bracket having a second mounting plate and a knuckle extending therefrom, the knuckle having a wall that defines a pin channel therein, the wall of the knuckle defining a first cutout at a first end of the knuckle configured to receive the first pin into the pin channel, the wall of the knuckle further defining a second cutout near a second end of the knuckle, the second cutout being L-shaped; and a spring biased locking mechanism having a pawl arm and a second pin, the locking mechanism positioned within the pin channel of the hinge bracket with the pawl arm positioned within and projecting from the second cutout and the second pin being coaxial within the pin channel, the pawl arm configured to move within the second cutout to push the second pin beyond the second end of the knuckle and through the through hole defined in the second pin tab of the mounting bracket.

2. The releasable hinge assembly of claim 1 wherein the first mounting plate and the two pin tabs are integrally formed.

3. The releasable hinge assembly of claim 1 wherein the first pin is integrally formed with the first pin tab.

4. The releasable hinge assembly of claim 1 wherein the first pin tab defines a through hole to which the first pin is attached.

5. The releasable hinge assembly of claim 1 further comprising a collar seated within the through hole defined in the second pin tab, the collar defining a through hole therein.

6. The releasable hinge assembly of claim 1 wherein the second mounting plate and the knuckle are integrally formed.

7. The releasable hinge assembly of claim 1 wherein the second mounting plate has two flanges extending therefrom.

8. The releasable hinge assembly of claim 1 wherein the pawl arm and the second pin of the spring biased locking mechanism are formed as two separate pieces.

9. The releasable hinge assembly of claim 1 wherein the spring biased locking mechanism is biased to push the second pin toward the second end of the knuckle.

10. The releasable hinge assembly of claim 1 wherein the mounting bracket is configured to be attached to a vehicle and wherein the hinge bracket is configured to be attached to a window of the vehicle.

* * * * *